Figure 7:
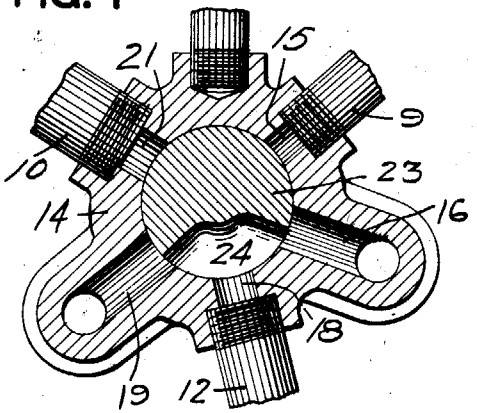

No. 12,712. REISSUED OCT. 29, 1907.
F. H. DUKESMITH.
AIR BRAKE SYSTEM.
APPLICATION FILED MAY 10, 1907.
3 SHEETS—SHEET 1.
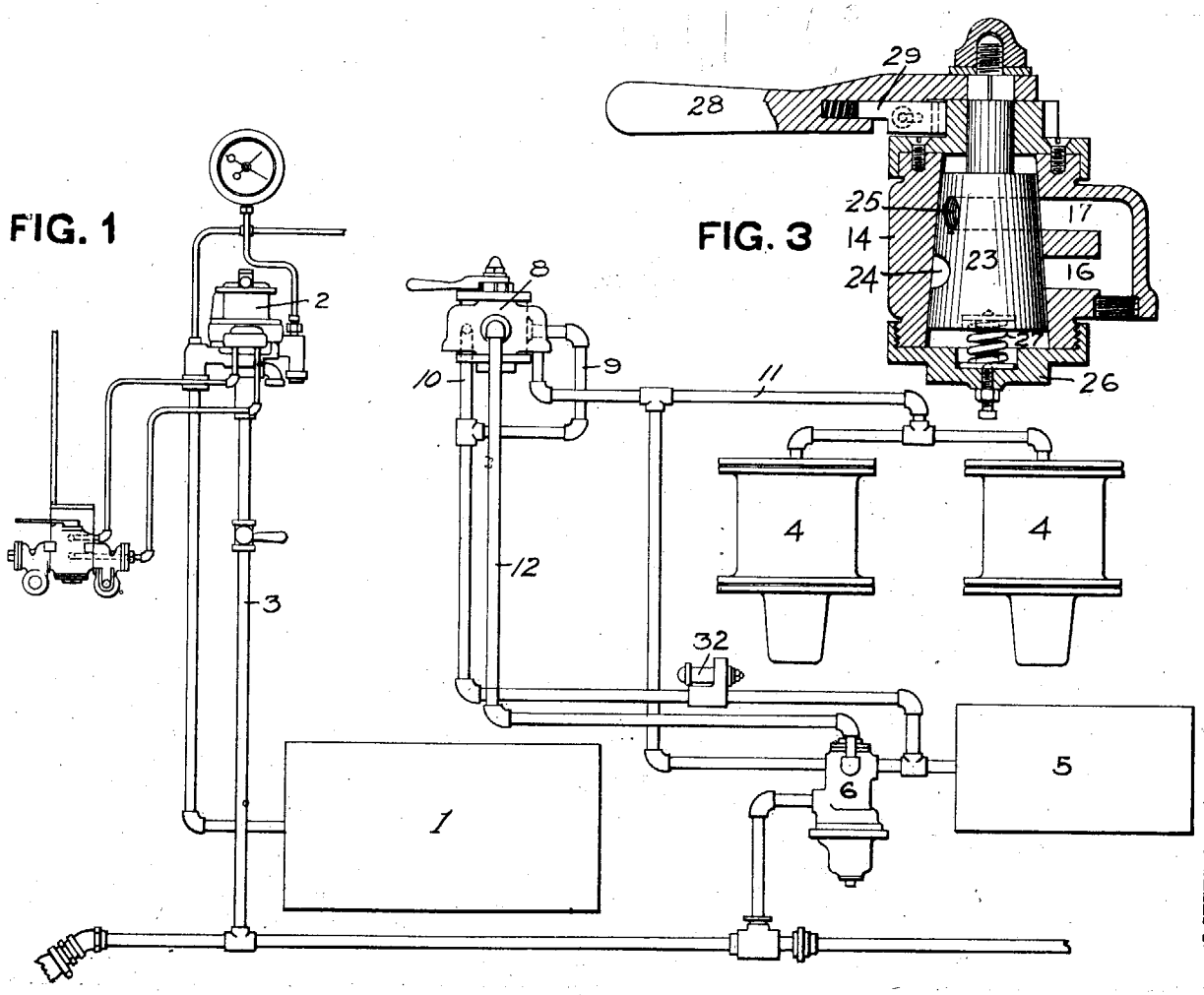
WITNESSES.
J. R. Keller
Robert C. Lotten
INVENTOR.
Frank H. Dukesmith
By Kay Lotten & Winter
Attorneys.

No. 12,712. REISSUED OCT. 29, 1907.
F. H. DUKESMITH.
AIR BRAKE SYSTEM.
APPLICATION FILED MAY 10, 1907.
3 SHEETS—SHEET 2.
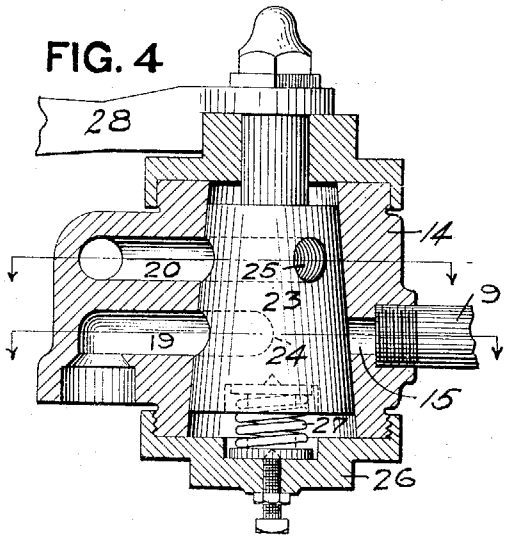
FIG. 4
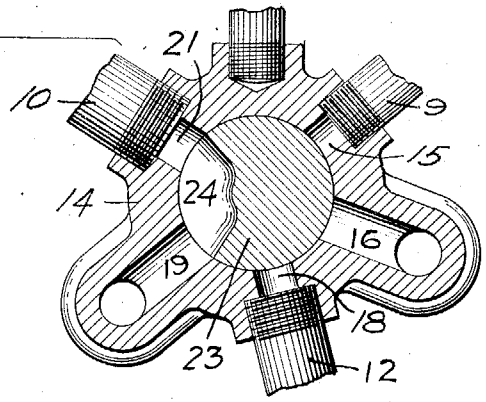
FIG. 5
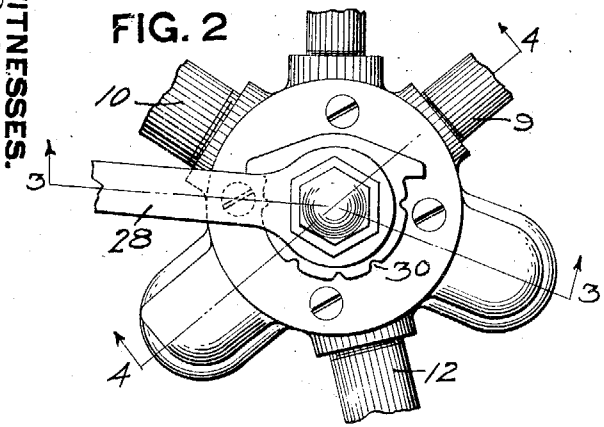
FIG. 2
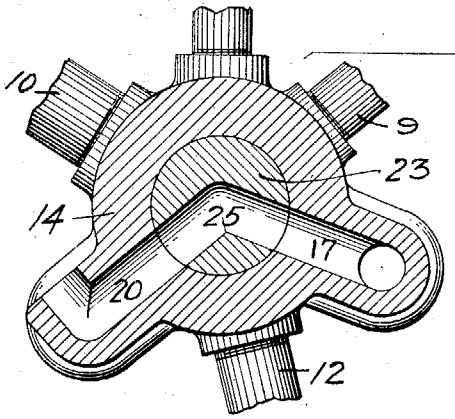
WITNESSES.
J. R. Killen
Robert C. Lotten
INVENTOR.
Frank H. Dukesmith
By King, Lotten & Winter
Attorneys.

No. 12,712. REISSUED OCT. 29, 1907.

F. H. DUKESMITH.

AIR BRAKE SYSTEM.

APPLICATION FILED MAY 10, 1907.

3 SHEETS—SHEET 3.

WITNESSES.

J. R. Kellen

Robert C. Totten

INVENTOR.

Frank H. Dukesmith

By Ker Totten & Winter

Attorneys

UNITED STATES PATENT OFFICE.

FRANK H. DUKESMITH, OF MEADVILLE, PENNSYLVANIA, ASSIGNOR TO THE DUKESMITH AIR BRAKE COMPANY, OF PITTSBURG, PENNSYLVANIA, A CORPORATION OF WEST VIRGINIA.

AIR-BRAKE SYSTEM.

No. 12,712. Specification of Reissued Letters Patent. Reissued Oct. 29. 1907.

Original No. 819,415, dated May 1, 1906, Serial No. 290,980. Application for reissue filed May 10, 1907. Serial No. 373,015.

*To all whom it may concern:*

Be it known that I, FRANK H. DUKESMITH, a citizen of the United States, residing at Meadville, in the county of Crawford and State of Pennsylvania, have invented new and useful Improvements in Air-Brake Systems, of which the following is a specification.

This invention relates to air-brake systems for railway trains; and its object, generally stated, is to provide a system whereby the engineer may control the engine brakes and train brakes independently of each other or in unison, as may be desired, whereby the engine brakes may be applied by air taken directly from the auxiliary reservoir, and whereby the engine auxiliary reservoir can be exhausted in order to get a very quick release of the engine brakes in case of a burst hose or other condition requiring immediate release of the engine brakes in order to prevent the remainder of the train from buckling.

One of the defects in existing air brake systems arises from the fact that the engineer has no control of the engine brakes independently of the train brakes. Many conditions arise under which this is advisable—such, for instance, as to prevent overheating of the engine tires or train car wheels, skidding of the engine wheels, to permit of recharging the train auxiliary reservoirs when descending grades, and other conditions well known to rail road men and in which a control of the engine brakes independently of the train brakes is highly desirable.

In the running of railway trains conditions frequently arise, and especially in switching, in which it is desirable to provide for the application of the engine brakes by straight air. Most of the existing air brake systems have no provision for so applying the engine brakes, thus making it difficult to handle the engine in switching cars and also frequently making it impossible to apply the brakes on the train, as may occur in case the triple valves should become deranged or cut out, and thus prevent the automatic operation of the brakes.

In case of bursting of a hose or the train pipe the brakes are set with very great force, and as the engine brakes have practically the same holding effect as the brakes on eight or ten cars the bursting of a hose will cause the front end of the train to be held practically rigid at the engine, while the remainder of the train will bunch onto the engine, frequently causing the train to buckle and throwing some of the cars off the track. This has led to many very serious wrecks. In fact, the bursting of a hose invariably leads to a wreck of a greater or less degree if the train is running at any considerable speed. To prevent these wrecks, it is necessary that the engine brakes be very quickly released in order to relieve the holding power at the front end of the train. With all modern automatic air brake systems the engine brakes can be released only through the exhaust port of the triple valve or by bleeding the brake cylinder. In either case, however, the exhaust of air from the brake cylinder is comparatively slow, it requiring from twenty to thirty seconds to entirely release the engine brakes when the triple valve is in full emergency position. The reason for this is that the auxiliary reservoir pressure must be drained through the triple valve, the ports of which are small.

The present invention provides an air brake system in which all of the foregoing defects are overcome, and provision is made for applying and releasing the brakes in such a manner that the engine brakes can be controlled independently of the train brakes for any purpose and wherein the engine brakes may be applied by straight air from the auxiliary reservoir and wherein the engine auxiliary reservoir can be directly vented to the atmosphere in order to get the quick release of the engine brakes in case of burst hose or similar emergency. These several functions are accomplished by the arrangement of parts hereinafter described and claimed.

Figure 9:
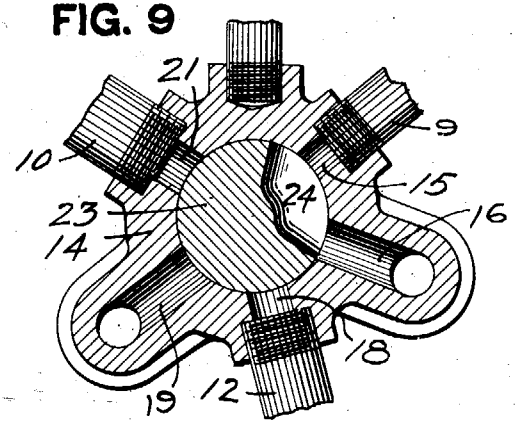
Figure 6:
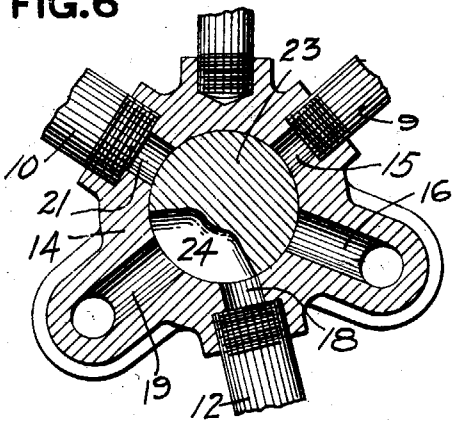
Figure 8:
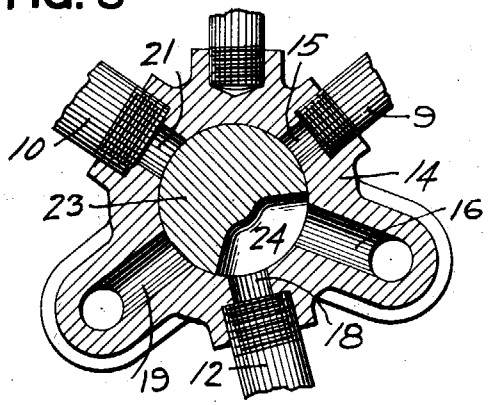

In the accompanying drawings, Figure 1 is a diagrammatic view of the air brake system with my improvements applied thereto; Fig. 2 is a plan view of the engineer's auxiliary control valve mechanism; Figs. 3 and 4 are vertical transverse sections of said valve mechanism, taken on the lines 3—3 and 4—4, Fig. 2; and Figs. 5, 6, 7, 8 and 9 are horizontal sectional views through the valve, showing the different positions thereof.

In the drawings, 1 indicates the main reservoir; 2, the usual engineer's valve; 3, the train pipe; 4, the engine brake cylinders; 5, the engine auxiliary reservoir, and 6 the engine triple valve. All of these parts may be of the same construction as usually employed in automatic air brake systems, and they are connected in the usual manner of connecting these parts. In addition to these parts I provide an engineer's auxiliary control valve 8, which is connected to the engine auxiliary reservoir by two pipes 9 and 10, to the engine brake cylinders by means of a pipe 11, and to the exhaust port of the engine triple valve by means of a pipe 12. The valve itself comprises a suitable casing 14, provided with a port 15, to which the auxiliary reservoir pipe 9 is connected, ports 16 and 17, to which the engine brake cylinder pipe 11 is connected, a port 18 to which the triple valve exhaust pipe 12 is connected, ports 19 and 20, leading to the atmosphere, and a port 21 to which the engine auxiliary reservoir pipe 10 is connected. The ports 15, 16, 18, 19, and 21 are in one horizontal plane, while the ports 17 and 20 are in a different horizontal plane. Working in this casing is an ordinary conical plug valve 23, having cut in one side a groove or passage 24, which is in the same horizontal plane as the ports 15, 16, 18, 19, and 21, and being provided above said groove with a port 25, cored through said plug and adapted to control the ports 17 and 20. This plug valve is held in the casing by the usual cap 26 and is held against its seat by a graduated spring 27. A suitable handle 28 is provided for turning the plug, this handle having the usual spring detent 29 adapted to fit in notches 30 in the valve cap or other convenient part, these notches determining the various positions of the valve.

The valve has five positions, as follows:

*First. Full-release position.*—In this position (shown in Fig. 5) groove 24 connects the auxiliary reservoir port 21 with the exhaust port 19, while the port 25 in the valve connects the brake cylinder port 17 with exhaust port 2. As a consequence the air is exhausted from both the auxiliary reservoir and the brake cylinder on the engine without having to pass through the engine triple valve. As a consequence the engine brakes are released very rapidly, and by making the several pipes of sufficient size this release may, if desired, be practically instantaneous. In any event the release will require only a fraction of the time required by existing systems. As a consequence in case of a burst hose the engine brakes can be released so quickly as to prevent the remainder of the train from piling onto the engine and buckling the train, causing the wrecks referred to.

*Second. Normal position.*—In this position (shown in Fig. 6) the groove 24 of the valve connects the triple valve exhaust port 18 to the exhaust port 19, while all other ports in the valves are closed. As a consequence the engine triple valve will be in the same condition as any ordinary triple valve and the engine brakes can be applied and released in the usual manner by the engineer's brake valve 2. Consequently the engineer has the same control over the train and engine brakes as with the ordinary automatic brake system.

*Third. Cylinder-release position.*—In this position (shown in Fig. 7) the groove 24 of the valve connects the brake cylinder port 16 with the exhaust port 19, while all other ports in the valve are lapped, except the triple valve exhaust port 18, which is also open to the groove 24 and through the same to the atmosphere. In case the brakes have been applied by the engineer's valve the engineer can bring the control valve to cylinder release position, and thereby release the brakes on the engine while holding the brakes on the remainder of the train, and if the engine triple valve is in lap position this will not effect the pressure in the engine auxiliary reservoir.

*Fourth. Lap position.*—In this position, (shown in Fig. 8) all of the ports in the valve are closed and will serve to retain the brakes on the engine as may be necessary in case the engineer wishes to recharge the auxiliary reservoirs on the train or to take the slack out of the train.

*Fifth. Application position.*—In this position (shown in Fig. 9) the groove 24 in the valve connects the auxiliary reservoir port 15 directly to the brake cylinder port 16, and as a consequence auxiliary reservoir pressure is taken directly into the engine brake cylinder. As a consequence the engine brakes can be fully applied and released even though the triple valve on the engine should be inoperative for any reason. To prevent the overcharging of the brake cylinder in this position, it is preferable to place a reducing valve, such as shown at 32, in the connection between the control valve and the auxiliary reservoir. By taking the air from the auxiliary reservior instead of the main reservoir I avoid wasting air from the train pipe and at the same time get equally as efficient an application of the brakes. The auxiliary reservoir will be recharged automatically through the triple valve.

The operation of the valve will be understood from the foregoing description. Under all ordinary running conditions the auxiliary control valve will be placed in the second or normal position, so that the engineer may have the usual control over his engine and train brakes by means of the engineer's valve. By bringing the valve to the four other positions above described the several functions mentioned will be attained.

What I claim is:

1. In an automatic air brake system, the combination of a brake cylinder, an auxiliary reservoir, a triple valve and an engineer's valve connected in the usual way, and control valve mechanism connected to the auxiliary reservoir and to the brake cylinder and arranged to connect both the brake cylinder and auxiliary reservoir to the atmosphere.

2. In an automatic air brake system, the combination of a brake cylinder, an auxiliary reservoir, a triple valve and an engineer's valve connected in the usual way, and control valve mechanism connected to the auxiliary reservoir port and to the triple valve exhaust port and arranged to connect both of said ports to the atmosphere.

3. In an automatic air brake system, the combination of a brake cylinder, an auxiliary reservoir, a triple valve and an engineer's valve connected in the usual way, and control valve mechanism connected to the auxiliary reservoir and the brake cylinder, and arranged to connect the auxiliary reservoir to both the atmosphere and to the brake cylinder.

4. In an automatic air brake system, the combination of a brake cylinder, an auxiliary reservoir, a triple valve and an engineer's valve connected in the usual way, and control valve mechanism connected to the brake cylinder, the auxiliary reservoir, and the triple valve exhaust port, and arranged to connect each of these to the atmosphere.

5. In an automatic air brake system, the combination of a brake cylinder, an auxiliary reservoir, a triple valve and an engineer's valve connected in the usual way, and control valve mechanism connected to the triple valve exhaust port, the brake cylinder and the auxiliary reservoir, and arranged to connect the triple valve exhaust port and brake cylinder to the atmosphere and connect the auxiliary reservoir to the brake cylinder.

6. In an automatic air brake system, the combination of a brake cylinder, an auxiliary reservoir, a triple valve and an engineer's valve connected in the usual way, and control valve mechanism connected to the auxiliary reservoir, the brake cylinder, and the triple valve exhaust port, and arranged to connect the auxiliary reservoir, the triple valve exhaust, and the brake cylinder to the atmosphere, and to also connect the auxiliary reservoir to the brake cylinder.

7. In an automatic air brake system, the combination of a brake cylinder, an auxiliary reservoir, a triple valve and an engineer's valve connected in the usual way and control valve mechanism connected to the auxiliary reservoir and brake cylinder, and arranged in one position to connect the auxiliary reservoir and the brake cylinder to the atmosphere, and in another position to connect only the brake cylinder to the atmosphere.

8. In an automatic air brake system, an auxiliary valve having ports for connection to the triple valve exhaust port, to the brake cylinder and to a source of air supply, and provided with a passage which serves in one position to connect the brake cylinder to the atmosphere, and in another position to connect the brake cylinder to the source of air supply.

9. In an automatic air brake system, an auxiliary valve having ports for connection to the triple valve exhaust port, to the brake cylinder and to a source of air supply, and provided with a passage which serves in one position to connect the triple valve exhaust port to the atmosphere, in another position to connect the brake cylinder to the atmosphere, and in still another position to connect the brake cylinder to the source of air supply.

10. In an automatic air brake system, an auxiliary valve casing having ports for connection to the triple valve exhaust port, to the brake cylinder and to a source of air supply and having a port to the atmosphere, and a rotary plug valve in said valve casing and provided with ports or grooves arranged in two planes only, said ports and grooves being arranged in one position of the valve to connect the brake cylinder to the atmosphere, in another position of the valve to connect the triple valve exhaust port to the atmosphere, and in still another position of the valve to connect the brake cylinder to the source of air supply.

11. In an automatic air brake system, an auxiliary valve casing having ports for connection to the triple valve exhaust port, to the brake cylinder, and to a source of air supply and having a port leading to the atmosphere, and a rotary plug valve in said valve casing and provided with passages arranged in two planes only, one of said passages being arranged to connect the brake cylinder to the atmosphere and the other of said passages being arranged in one position of the valve to connect the brake cylinder to the atmosphere, in another position of the valve to connect the brake cylinder to the source of air supply, and in still another position of the valve to connect the triple valve exhaust port to the atmosphere.

In testimony whereof, I, the said FRANK H. DUKESMITH, have hereunto set my hand.

FRANK H. DUKESMITH.

Witnesses:

ROBERT C. TOTTEN,

F. W. WINTER.